Patented Jan. 11, 1944

2,339,028

UNITED STATES PATENT OFFICE 2,339,028

PRESERVATION OF POTATOES, FRUIT, AND VEGETABLES

Ernest L. Nixon, State College, Pa.

No Drawing. Application July 16, 1941,
Serial No. 402,694

5 Claims. (Cl. 99—204)

This invention relates to the preservation of cell structure of eatable plants, vegetables and fruits, and more especially to cell fixation through the medium of thermal application to the eatable products.

It has long been desired to discover a process by which edible plants and fruits could be preserved in a dehydrated form to thereby reduce the weight and bulk of the products, and in the process to retain the freshness and palatability of the fresh product, and in so doing to maintain the major portion of the cells forming the product to be preserved, without rupture or plasmolysis occurring, and thereby altering the cell wall and/or content therein.

Applicant is fully aware of the prior art relating to this subject matter, and is also aware of the many attempts that have been made to solve the problem of cell preservation in the dehydrating if edible plants and fruits, and to the best of his knowledge no one has succeeded in solving this most aggravating problem. It must be recognized that the control of maintaining the cell wall or walls, and the loss or break-up of the contents therein of dehydrated edible materials involves protoplasmatic activities under temperature changes, histological activity, and the physiological content and chemical composition of the cell and cell content.

After long and expensive research and experimentation, the results of this invention provide a definite and scientifically proved process which can be applied to any of the plants, vegetables, root-stocks, tubers, bulbs and fruits.

It is well understood and agreed by those versed in the various phases of plant life, that root-stocks, tubers and bulbs have been developed to act as storehouses for reserve materials which the plant has accumulated during its life span or during the growing season, for self-preservation.

Storage roots or root-stalks are most familiarly illustrated by beets, carrots, parsnips, turnips and sweet potatoes, and the most familiar example of tubers is the common potato (*Solanum tuberosum*), and bulbs are most commonly illustrated by the onion, lily, hyacinth, tulip and the like.

All of these special plant modifications contain large quantities of carbohydrates (starch or sugar) and protein, singly or in combination. They are also rich in vitamins and valuable minerals. All of these elements are produced as a result of the sun's action on the chlorophill contained in the leaves of the plants, and these plant modifications have consequently become indispensable as a source of human food.

These special plant modifications differ more in form and structure than in composition, and their preservation and preparation as a food source has always been a problem confronting mankind, and it is well recognized by those skilled in the art that it is most difficult to preserve such plant modifications in their fresh state and under adverse conditions, such as heat or cold. They, therefore, cannot be kept for comparatively long periods of time under even the most optimum conditions.

Various and sundry attempts have been made to preserve those plant modifications, through the process of drying with or without cooking, but always with disastrous results from the standpoint of maintaining their freshness or palatability.

It is also agreed by those skilled in the art that the structure of these roots, bulbs or tubers morphologically are quite different, but cytologically are surprisingly alike in that they are all composed of cells. It is further recognized that all plant life is also of cellular structure, which includes the various and sundry varieties of fruit.

This invention, therefore, deals primarily with cell structure and cell behavior under varying temperatures. It is essential to a complete understanding of the process of the present invention to discuss in detail the cell structure, the contents thereof, and the action of the cell when subjected to varying degrees of heat or cold.

The cell of a plant is in reality a protoplast, an individual organized droplet of protoplasm housed in a cellulose box or container. This statement is easily proved by the well known process plasmolysis. The protoplast which may be illustrated as the housing or covering of the protoplasm, when subjected to a concentrated solution of salt or sugar of higher concentration than the salt or sugar content of the cell, causes the cell to lose water to the outside solution, and the protoplast shrinks away from the cell wall. This action is the result due to the turgidity of the cell being reduced, i. e. the protoplast shrinks as does a toy balloon from which air is slowly escaping, thus in plasmolyzed cells the membrane pulls away from the wall, shrinking the protoplasm and disrupting the contents thereof.

In a typical cell the contents consists of the protoplasm comprising a nucleus, which is generally a spherical or ovoid body, centrally or peripherally located, the vacuole, a centrally located sac filled with salts, sugar and organic substances in aqueous solutions. Other structures are also contained within the cell and it is believed, however, unnecessary to discuss them here in detail.

Therefore, in treating one of these plant modifications, it is a matter of dealing with cells and cellular structures.

In the preparation of plant tissue for cytological purpose it is found that quick penetrating solutions are required to kill or fix the cells and cellular contents thereof, thus rendering the primordial utricle permeable to the flow of liquids without causing plasmolysis of the cell.

It is, therefore, of fundamental importance in the preservation of cellular structures to preserve the produce without permitting any plasmolysis occurring therein. Therefore in the pre-treatment of vegetables and fruits in the process of dehydrating and preserving the same in their natural state, it is found that by immersing the cleaned and/or peeled products immediately into boiling water or steam vapor at 212° F. or more, and maintaining or increasing this temperature until the products are thoroughly cooked, and to maintain or gradually increase the temperature during the dehydrating operation until the moisture content of the product has been reduced to ten percent of the total weight or less, the cellular structure is preserved without any plasmolytic effect.

It should be carefully noted that during the entire processing of the product the cooking temperature must be maintained or gradually increased in order to thoroughly fix the cells and the contents thereof, otherwise a slight lowering of the temperature during the removal of the cooking to the dehydrating operation through the inhibition of hydroscopic moisture, causes many of the cells to be broken down and thereby altered chemically and cytologically, rendering the product unpalatable, and incapable of returning to its original cellular state.

It is, therefore, of the utmost importance that the fixation process of the cells and their contents be carried on with the greatest of care and under precisely controlled conditions.

The product to be treated is initially prepared in any desired manner, such as washing or other similar cleaning means, and peeling the product when necessary or desired.

If the product is peeled, preferably no elapsed time should occur between the peeling operation and the cooking of the product.

After the cleaning and/or peeling of the product it is subjected to a cooking temperature of 212° F. or higher. The cooking may be performed in one of two ways, either by immersing the product in water of 212° F. plus, or by subjecting the product to a staturated atmosphere such as steam; the latter temperature may range from 212° F. to 240° F. and under pressure, if desired. The cooking will obviously vary, depending upon the size of the product, the type or variety, and where boiling is used, upon the altitude.

The product is cooked to the desired consistency and when completed, the water is drawn away or the product removed from the water or steam as the case may be.

The next step must be carefully controlled. If it is desired to extrude the product, for more rapid dehydrating or slicing the product, or reducing the size and shape before the dehydrating process starts, the temperature surrounding the product must be maintained at or slightly above the cooking temperature. If the temperature is not controlled and maintained, plasmolysis or rupture of the cells will take place, thus rendering the product unpalatable for sale as an edible food. The matter of keeping the product hot during the operations following the cooking is not sufficient to cause fixation of the cells, as the temperature even though slightly lowered has a decided effect on fixation. This is true until the moisture content has been reduced to ten percent or less.

The dehydrating operation is of extreme importance and is one of temperature and humidity control. The temperature at the start of dehydrating must be slightly higher (about 2° to 20° F.) than the cooking temperature. The temperature is gradually increased and the humidity lowered during this operation, and is carried on continuously and without interruption until the moisture content of the product has been reduced to the desirable and/or preservative condition.

When the desired moisture content has been reached, the cell structure is positively fixed, and will remain so indefinitely, thus providing a dehydrated product, which when mixed with hot water, milk, etc., will return to its original cellular condition, having the same flavor, etc., as in the fresh cooked state.

I am fully aware of the prior art, such as Remmers Patent No. 1,258,047, Stoddard Patent No. 1,402,108, Gano Patent No. 2,190,063 and others, but none of the prior patents involve applicant's concept of temperature and humidity control to produce a superior dehydrated product whose cell foundation is preserved.

What I claim is:

1. The process of preserving potatoes comprising the steps of cooking the potato to a crystalline or granular form and thereafter without reducing the cooking temperature below that of cooking, treating the cooked potato in an arid atmosphere wherein the temperature is gradually increased and the humidity decreased until the potatoes have reached a condition of moisture content of less than 10%.

2. The process of preserving fruits which includes the steps of thoroughly cooking the fruit and immediately thereafter subjecting the fruit to an increased temperature and progressively increasing the said temperature and decreasing the humidity until the fruit has reached a desired moisture content.

3. The method of preserving vegetables and the like, which includes the steps of completely cooking the vegetables in a liquid, removing the vegetables from the liquid to a humid atmosphere of the same or higher temperature than the liquid, and thereafter reducing the humidity and increasing the temperature of the surrounding atmosphere until the water content of the vegetables has been reduced to the desired condition.

4. The process of dehydrating edible fruits or vegetables, consisting in subjecting the fruit or vegetables to a cooking operation and without lowering the cooking temperature of the cooked fruit or vegetables immediately subjecting the fruit or vegetables to an atmosphere of increasing temperature and decreasing humidity.

5. The herein described process of preparing a food product which process comprises in the steps of cooking the food product to the desired cooked consistency, immediately thereafter and while maintaining the cooking temperatures, forming the cooked material into shredded or elongated particles and thereafter gradually increasing the temperature and decreasing the humidity of the surrounding air until the moisture content of the material reached the desired preservative state, and thereafter slowly cooling the material until the temperature of the same has been reduced to room temperature.

ERNEST L. NIXON.